H. C. W. Battermann,
Bird Cage.
N° 32,855.   Patented July 23, 1861.
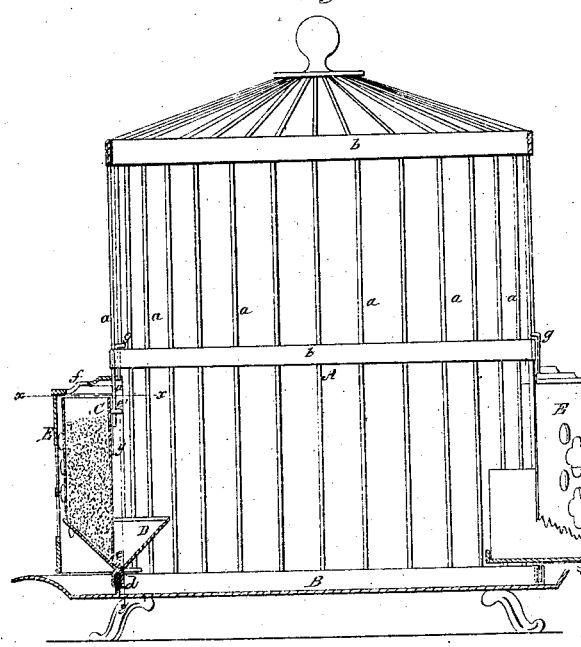
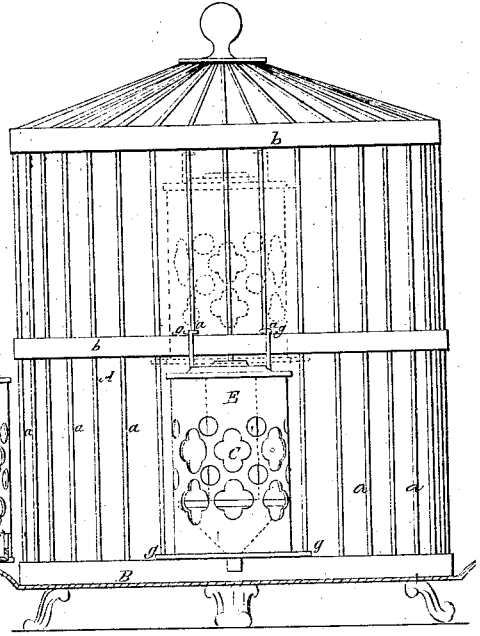
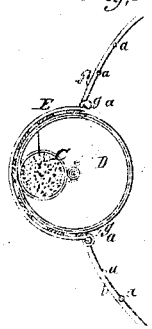
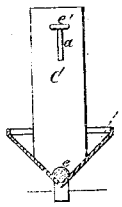

UNITED STATES PATENT OFFICE.

H. C. W. BATTERMANN, OF NEW YORK, N. Y.

BIRD-CAGE.

Specification of Letters Patent No. 32,855, dated July 23, 1861.

*To all whom it may concern:*

Be it known that I, H. C. W. BATTERMANN, of the city, county, and State of New York, have invented certain new and useful Improvements in Bird-Cages; and I do hereby declare that the following is a full, clear, and exact description of the same, reference being had to the accompanying drawing, making a part of this specification, in which—

Figure 1, represents a vertical, central section of my invention. Fig. 2, is a front elevation of the same. Fig. 3, is a horizontal section of the same, taken in the plane indicated by the line $x\ x$, in Fig. 1. Fig. 4, is a detached sectional elevation of the seed cup.

Similar letters of reference indicate corresponding parts in the several figures.

This invention consists in the arrangement of a seed cup with a small discharge opening at or near its bottom, in combination with a conical bowl which forms the bottom end of said cup, in such a manner and in such relation to the cage that only a small quantity of seed (such as passes from the cup through the discharge opening into the bowl) is accessible to the bird, and all wasting and spilling of the seed is prevented.

It also consists in the arrangement of loops, or their equivalents, sliding on the bars of the cage framing, in combination with the case surrounding and protecting the seed cup, in such a manner that a vertically-sliding motion can be imparted to the case, thereby exposing the seed cup whenever it is desired to fill it or clean it.

To enable others skilled in the art to make and use my invention, I will proceed to describe its construction and operation with reference to the drawing.

The cage frame, A, is made in the usual manner, of a series of upright bars or wires, $a$, secured together by cross bands, $b$, and it is supported by the bottom, B. Secured to the side of the framing is the seed cup, C, which consists of an upright cylindrical vessel, the bottom part of which forms the bowl, D. This cup C has a lug $d$ attached to its lower extremity which is made to slip over and fit the lower cross band $b$ of the cage, and it is retained by a loop, $e^*$, passing around one of the bars of the cage framing, as clearly shown in Fig. 1 of the drawing; the whole being arranged in such a manner that said cup can be removed from the cage whenever it is desired, with facility.

The seed cup, C, communicates with the bowl, D, through a small opening, $e$, at the lowest part of the bowl, and a small quantity of seed passes from the cup into the bowl, the discharge being stopped as soon as the seed in the bowl rises high enough to cover up the opening, $e$. The bird has access to the interior of the bowl, the interior of the cup being entirely out of its reach, and all the seed he can get at is that quantity which discharges into the bowl. By these means, all spilling and wasting of the seed is prevented, and still the bird is allowed to eat all he wants. As soon as the quantity of seed in the bowl diminishes, a fresh supply passes over from the cup.

The cup is protected on the outside by a case, E, which may be perforated and ornamented in the usual or any other manner. This case is provided with a hole, $f$, in its top, through which seed can be introduced into the cup, C, and it (the case) is secured to loops, $g$, which pass around and slide upon four of the vertical bar or bars, $a$, of the cage framing, so that, when it is desired to take the seed cup out, to clean or fill the same, said case can be moved up vertically with facility. By these means no hinges nor holes are required, and the case, E, cannot be detached from the framing and mislaid or lost. The water cup, C′, is placed into a disk, $h$, which is secured to the bottom of the cage by means of pins, $i$.

Having thus fully described my invention, what I claim as new and desire to secure by Letters Patent, is—

1. The arrangement and combination of the seed cup, C, discharge opening, $e$, and bowl, D, constructed and operating substantially as and for the purpose shown and described.

2. The vertically-sliding loops, $g$, or their equivalents, in combination with the protecting case, E, as and for the purpose set forth.

H. C. W. BATTERMANN.

Witnesses:
 NELSON CROSS,
 JAMES OTIS DENNISTON.